(12) United States Patent
Hyeon

(10) Patent No.: US 10,899,332 B2
(45) Date of Patent: Jan. 26, 2021

(54) ELECTRIC CALIPER BRAKE

(71) Applicant: MANDO CORPORATION, Gyeonggi-do (KR)

(72) Inventor: Se Ra Hyeon, Ulsan (KR)

(73) Assignee: MANDO CORPORATION, Gyeonggi-do (KR)

( * ) Notice: Subject to any disclaimer, the term of this patent is extended or adjusted under 35 U.S.C. 154(b) by 43 days.

(21) Appl. No.: 16/278,044

(22) Filed: Feb. 15, 2019

(65) Prior Publication Data
US 2019/0256072 A1 Aug. 22, 2019

(30) Foreign Application Priority Data
Feb. 20, 2018 (KR) .................... 10-2018-0019917

(51) Int. Cl.
*F16D 65/18* (2006.01)
*B60T 13/74* (2006.01)
(Continued)

(52) U.S. Cl.
CPC ............ *B60T 13/741* (2013.01); *B60T 1/065* (2013.01); *F16D 55/225* (2013.01); *F16D 65/18* (2013.01);
(Continued)

(58) Field of Classification Search
CPC ........... F16D 2125/405; F16D 2125/40; F16D 2121/24; B60T 13/741; F16H 25/20
(Continued)

(56) References Cited

U.S. PATENT DOCUMENTS 5,337,627 A * 8/1994 Nakamura .......... F16H 25/2204
74/424.76
6,264,011 B1 * 7/2001 Zernickel ................ F16D 65/18
188/156
(Continued)

FOREIGN PATENT DOCUMENTS

JP 2711611 2/1998
KR 10-2018-0003117 1/2018

OTHER PUBLICATIONS

Office Action dated Apr. 9, 2019 for Korean Application No. 10-2018-0019917 and its English machine translation by Google Translate.

*Primary Examiner* — Bradley T King
(74) *Attorney, Agent, or Firm* — Ladas & Parry, LLP

(57) ABSTRACT

An electric caliper brake is provided. The electric caliper brake includes a carrier in which a pair of pad plates are installed to be movable forward and backward, and a caliper housing in which a cylinder having a piston installed to be movable forward to and backward from the carrier due to a hydraulic pressure is provided. The electric caliper brake includes a power transmission module, which includes a spindle member installed to pass through a rear portion of the cylinder and configured to receive rotational power from an actuator to rotate, and a nut member screw-coupled to the spindle member, disposed in the piston, and configured to move forward or backward according to rotation of the spindle member to operate the piston, wherein the spindle member includes a first screw thread portion corresponding to a screw thread formed on the nut member and a second screw thread portion, which is disposed to have the same axis as that of the first screw thread portion and has a pitch which is different from that of the first screw thread portion, and when the nut member rotates about the second screw
(Continued)

thread portion, a frictional force between the screw thread of the nut member and the second screw thread increases.

4 Claims, 4 Drawing Sheets

(51) Int. Cl.
  *B60T 1/06* (2006.01)
  *F16D 55/225* (2006.01)
  *F16D 121/24* (2012.01)
  *F16D 125/40* (2012.01)
(52) U.S. Cl.
  CPC ........ *F16D 65/183* (2013.01); *F16D 2121/24* (2013.01); *F16D 2125/40* (2013.01)
(58) Field of Classification Search
  USPC ...................................... 74/424.76
  See application file for complete search history.

(56) References Cited

U.S. PATENT DOCUMENTS

| | | | | |
|---|---|---|---|---|
| 2005/0006187 | A1* | 1/2005 | Kramer | F16D 65/18 |
| | | | | 188/72.8 |
| 2008/0060463 | A1* | 3/2008 | Bochen | E05F 1/1058 |
| | | | | 74/424.76 |
| 2016/0215840 | A1* | 7/2016 | Chelaidite | F16D 55/226 |
| 2016/0355169 | A1* | 12/2016 | Ohlig | B60T 13/741 |
| 2017/0328432 | A1* | 11/2017 | Chelaidite | F16D 65/183 |
| 2018/0298963 | A1* | 10/2018 | Demorais | B60T 1/065 |
| 2019/0106925 | A1* | 4/2019 | McCorkell | F16H 25/24 |

\* cited by examiner

ELECTRIC CALIPER BRAKE

CROSS-REFERENCE TO RELATED APPLICATION

This application claims priority to and the benefit of Korean Patent Application No. 2018-0019917, filed on Feb. 20, 2018, the disclosure of which is incorporated herein by reference in its entirety.

BACKGROUND

1. Field of the Invention

The present invention relates to an electric caliper brake, and more specifically, to an electric caliper brake for a vehicle.

2. Discussion of Related Art

Generally, an electric caliper brake includes a typical hydraulic disc brake and a separate actuator which operates electrically.

A conventional electric disc brake system (hereinafter, referred to as a 'electric caliper brake') includes a disc configured to rotate with a wheel of a vehicle, a carrier in which a pair of pad plates are installed to be movable forward and backward so as to press the disc, a caliper housing in which a cylinder, which is installed to be slidable in the carrier and in which a piston is installed to be movable forward and backward due to a hydraulic brake pressure, is provided, a spindle unit configured to drive the piston, and a motor and a reducer which are configured to transmit rotational power to the spindle unit.

Such an electric caliper brake has a structure configured to perform a braking operation by pressing the piston according to a hydraulic brake pressure or perform a parking function by pressing the piston using a spindle unit configured to receive rotational power of the motor and convert rotational motion to linear motion.

In the case of the electric caliper brake, the spindle unit includes a spindle member having a bolt form and a nut member rotatably coupled to the spindle member and, in the case of the conventional electric caliper brake, has a structure in which a separate stopper is installed in the cylinder, and rotation of a nut stops when the nut comes into contact with the stopper.

In the case in which the separate stopper is installed in the electric caliper brake, there are problems in that noise is generated due to vibrations and a processing cost for manufacturing stopper is increased.

SUMMARY OF THE INVENTION

The present invention is directed to providing an electric caliper brake capable of reducing vibration and friction noise and a processing cost for manufacturing a separate stopper.

According to an aspect of the present invention, there is provided an electric caliper brake including a carrier in which a pair of pad plates are installed to be movable forward and backward and a caliper housing in which a cylinder having a piston installed to be movable forward to and backward from the carrier due to a hydraulic pressure is provided, the electric caliper brake comprising a power transmission module, which includes a spindle member installed to pass through a rear portion of the cylinder and configured to receive rotational power from an actuator to rotate, and a nut member screw-coupled to the spindle member, disposed in the piston, and configured to move forward or backward according to rotation of the spindle member to move the piston, wherein the spindle member includes a first screw thread portion corresponding to a screw thread formed on the nut member and a second screw thread portion, which is disposed to have the same axis as that of the first screw thread portion and has a pitch which is different from that of the first screw thread portion, and when the nut member rotates about the second screw thread portion, a frictional force between the screw thread of the nut member and the second screw thread increases.

The first screw thread portion may be disposed at a side of an end portion of the spindle member to be closer to the carrier than the second screw thread portion.

The pitch of the second screw thread portion may be 0.8 to 1.8 (excepting 1) times that of the first screw thread portion.

The spindle member may include a first bolt member formed in a hollow form and including the first screw thread portion and a second bolt member in which a central shaft coupled to a hollow portion of the first bolt member is formed to protrude and which includes the second screw thread portion disposed adjacent to the first screw thread portion.

The electric caliper brake may further include a controller configured to control a current supplied to the actuator to stop rotation of the spindle member when the frictional force between the screw thread of the nut member and the second screw thread increases to have a predetermined frictional force.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
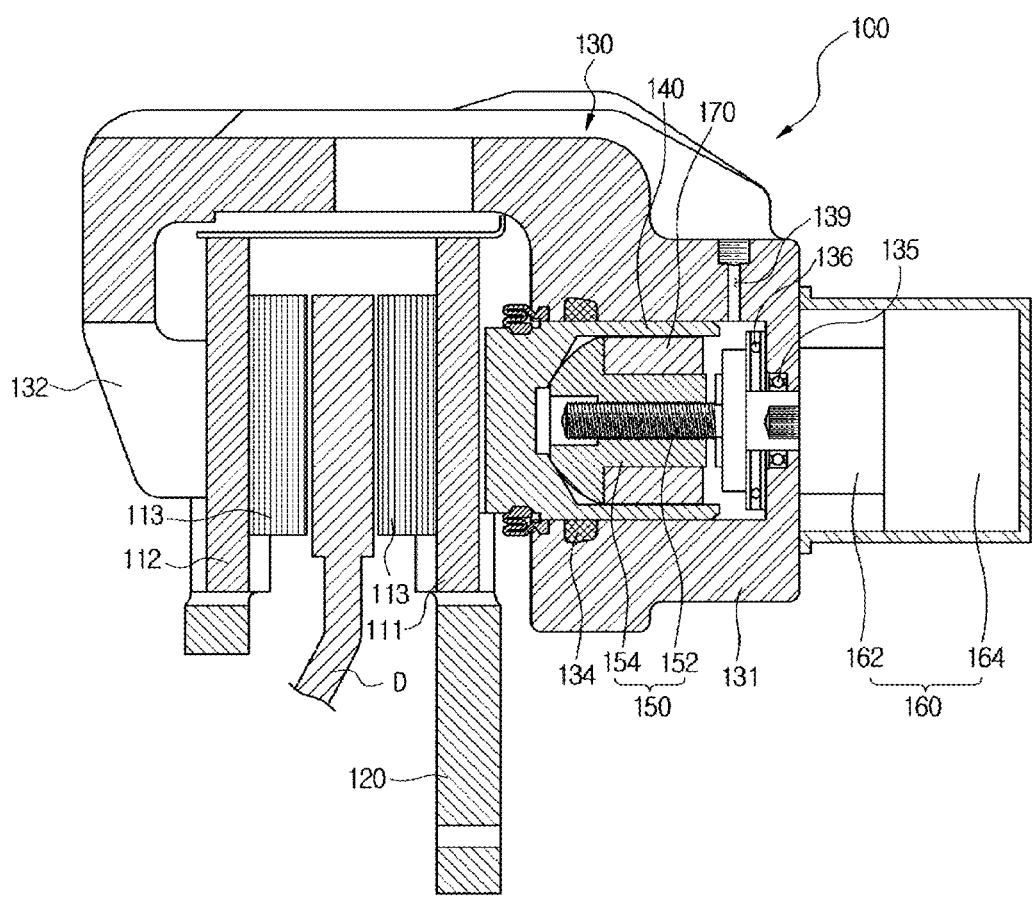
FIG. 1 is a schematic cross-sectional view illustrating an electric caliper brake according to one embodiment of the present invention.

Hereinafter, embodiments of the present invention will be described in detail with reference to the accompanying drawings. The following embodiments are examples to provide the scope of the present invention to those skilled in the art. The present invention is not limited to the following embodiments and may be implemented in different forms. In the drawings, portions which are not related to the description may be omitted for clarifying the present invention, and sizes of components may be exaggerated for understanding the present invention.

Figure 2:
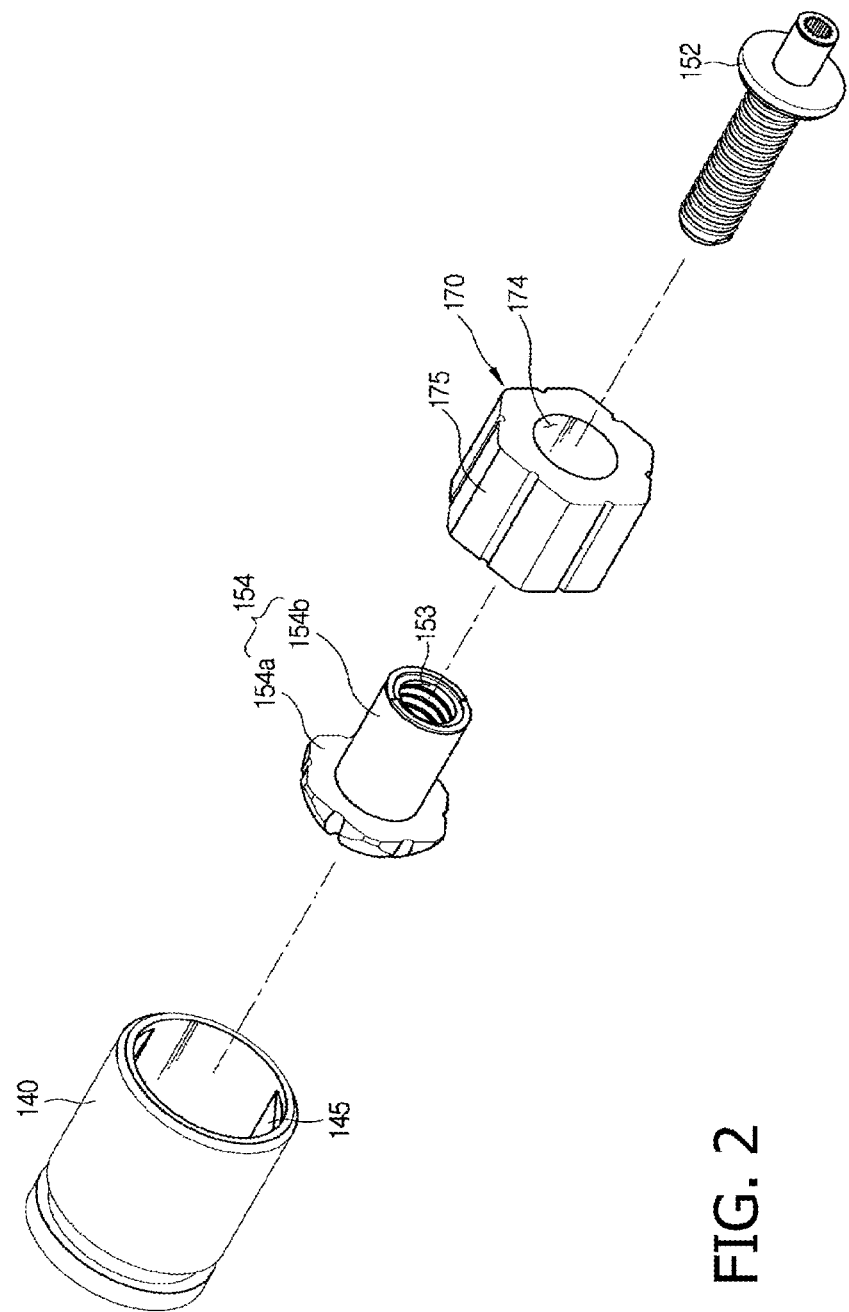
FIG. 2 is an exploded perspective view illustrating a coupling state of a piston and a power transmission module included in the electric caliper brake according to one embodiment of the present invention.

FIG. 1 is a schematic cross-sectional view illustrating an electric caliper brake according to one embodiment of the present invention. FIG. 2 is an exploded perspective view illustrating a coupling state of a piston and a power transmission module included in the electric caliper brake according to one embodiment of the present invention. Hereinafter, when the electric caliper brake according to one embodiment of the present invention will be described with reference to the drawings, a direction in which a pad plate of the electric caliper brake is positioned is defined as a forward direction of the caliper brake, and the opposite direction thereof is defined as a backward direction of the caliper brake in FIG. 1.

Referring to FIGS. 1 and 2, an electric caliper brake 100 according to one embodiment of the present invention includes a disc D configured to rotate with a wheel (not shown) of a vehicle, a carrier 120 in which a pair of pad plates 111 and 112 are installed to be movable forward and backward so as to press the disc D, a caliper housing 130 in which a cylinder 131 having a piston 140 installed to be movable forward to and backward from the carrier 120 due to a hydraulic pressure is provided, a power transmission module 150 configured to operate the piston 140, an actuator 160 configured to provide rotational power to the power transmission module 150, and a filling member 170 installed in the piston 140.

The pair of pad plates 111 and 112 include a first pad plate 111 disposed to come into contact with the piston 140 and a second pad plate 112 configured to come into contact with a finger portion 132 of the caliper housing 130. The pair of pad plates 111 and 112 are installed in the carrier 120 fixed to a vehicle body so as to move forward to or backward from both side surfaces of the disc D. In addition, a friction pad 113 may be attached to one surface of each of the pad plates 111 and 112 facing the disc D.

The caliper housing 130 is installed on the carrier 120. More specifically, the caliper housing 130 includes the cylinder 131, in which the piston 140 is embedded to be movable forward and backward, and a finger portion 132 formed to be bent downward at a front portion thereof so as to operate the second pad plate 112. Here, the finger portion 132 and the cylinder 131 may be integrally formed.

The power transmission module 150 is installed in the piston 140 of the caliper housing 130, and the actuator 160 is coupled to the power transmission module 150.

The piston 140 is formed in a cylindrical form of which an inside is hollowed out in a cup shape and is formed in the cylinder 131 to be slidable toward the pair of pad plates. The piston 140 is formed to press the first pad plate 111 toward the disc D due to the power transmission module 150 which receives rotational power of the actuator 160.

More specifically, when a hydraulic pressure for braking is applied to an inside of the cylinder 131, the piston 140 may move forward to the first pad plate 111 to press the first pad plate 111, and the caliper housing 130 may operate due to a reaction force in a direction opposite to a direction in which the piston 140 operates such that the finger portion 132 presses the second pad plate 112 toward the disc D to perform braking.

Meanwhile, an oil port 139, through which a brake oil is introduced into the cylinder 131 so as to apply a hydraulic pressure for braking, is formed in the caliper housing 130, and a sealing portion 134 configured to prevent oil from leaking is provided between an outer surface of the piston 140 and an inner surface of the cylinder 131. The sealing portion 134 serves to prevent the brake oil introduced into the cylinder 131 from leaking and to return the piston 140 to an original position thereof when a braking operation is released.

The power transmission module 150 serves to press the piston 140 toward the first pad plate 111 by receiving rotational power from the actuator 160 including the motor 164 and the reducer 162. Here, since the reducer 162 is a widely known technology, the reducer 162 will not be described.

The power transmission module 150 may include a nut member 154, which is installed to be disposed in the piston 140 and to be in contact with the piston 140, and a spindle member 152 screw-coupled to the nut member 154.

One side of the spindle member 152 is rotatably installed in the caliper housing 130, that is, in the cylinder 131, and the other side thereof is disposed in the piston 140. Here, one side of the spindle member 152 installed in the cylinder 131 is formed to be connected to the reducer 162 to receive rotational power of the motor 164. A male screw thread is formed at an outer circumferential surface of the other side of the spindle member 152. In order to support the spindle member 152, a first bearing 135 and a second bearing 136 are formed in the cylinder 131 at positions spaced apart from each other. Here, the second bearing 136 is a thrust bearing and receives a reaction force transmitted through the spindle member 152 according to forward or backward movement of the nut member 154 during a braking operation.

Referring to FIG. 2, a through hole 153 which passes through a center of the nut member 154 in a longitudinal direction thereof is formed in the nut member 154 to be screw-coupled to the spindle member 152, and a female thread is formed in the through hole 153. Accordingly, the nut member 154 moves forward or backward according to a rotating direction of the spindle member 152 to serve to operate the piston 140.

The nut member 154 is formed such that rotation thereof is restricted with respect to the spindle member 152 to linearly move according to rotation of the spindle member 152. To this end, the filling member 170 for restricting rotation of the nut member 154 is installed between the piston 140 and the nut member 154.

More specifically, the filling member 170 includes a hollow portion 174 at a center thereof and is coupled to the nut member 154 by press-insertion. Here, the nut member 154 includes a head portion 154a configured to be in contact with the piston 140 and a rod 154b which extends from the head portion 154a and in which a screw thread is formed on an inner circumferential surface thereof to be screw-coupled to the spindle member 152. The head portion 154a and the rod 154b are integrally formed.

Since the hollow portion 174 is provided at the center of the filling member 170, the hollow portion 174 may be coupled to the rod 154b of the nut member 154 by press-insertion. Here, the filling member 170 includes a rotation prevention surface 175 having at least one flat surface on an outer circumferential surface thereof. The rotation prevention surface 175 of the filling member 170 is formed to come into contact with corresponding rotation prevention surfaces 145 and formed on an inner circumferential surface of the piston 140. Referring to FIG. 2, although the filling member 170 is formed to have a hexagonal shape and two corresponding rotation prevention surfaces 145 are formed on the inner circumferential surface of the piston 140, the number of rotation prevention surfaces 175 formed on an outer circumferential surface of the filling member 170 and the number of the corresponding rotation prevention surfaces 145 of the piston 140 may be increased or decreased. In addition, a rotation prevention surface having at least one flat surface corresponding to the rotation prevention surface 175 of the filling member 170 may also be formed on the head portion 154a of the nut member 154. Accordingly, the nut member 154 is coupled to the filling member 170 by press-insertion, both the nut member 154 and the filling member 170 are inserted into the piston 140 to have a predetermined distance between the filling member 170 and the inner circumferential surface of the piston 140 when coupled to the piston 140, rotation of the nut member 154 and the filling member 170 is restricted, and thus the nut member 154 linearly moves according to rotation of the spindle member 152.

As described above, since the filling member 170 is inserted into the piston 140 in a state in which the filling member 170 is coupled to the nut member 154 by press-insertion and rotation of the filling member 170 is restricted, an inner space of the piston 140 is filled therewith. Accordingly, a brake oil introduced through the oil port 139 presses the piston 140, the inside of which is filled, to press the piston 140 toward the disc D.

Figure 3:
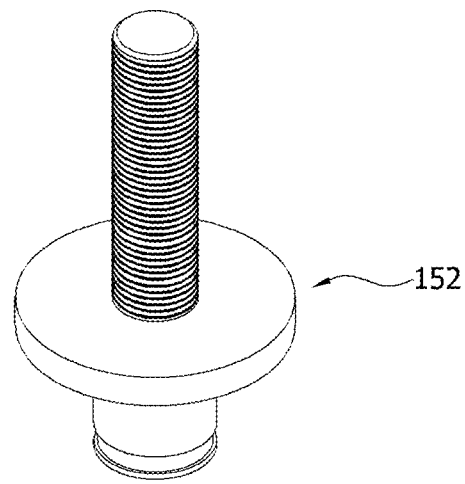
FIG. 3 is a perspective view illustrating a spindle member of the power transmission module of FIG. 2.
Figure 4:
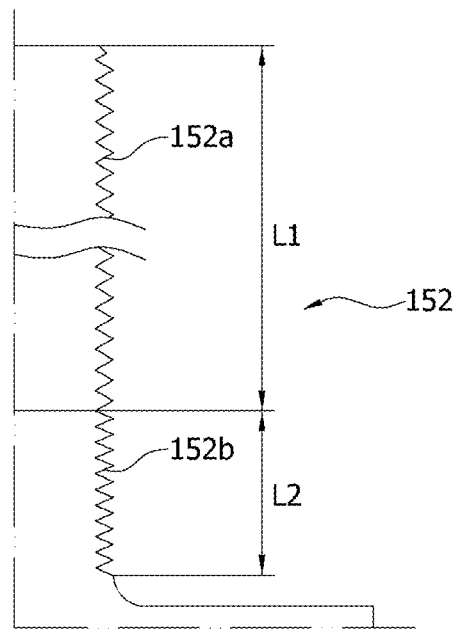
FIG. 4 is a cross-sectional view illustrating a first screw thread portion and a second screw thread portion of the spindle member of FIG. 3.

FIG. 3 is a perspective view illustrating the spindle member of the power transmission module of FIG. 2, and FIG. 4 is a cross-sectional view illustrating a first screw thread portion and a second screw thread portion of the spindle member of FIG. 3.

Referring to FIGS. 3 and 4, the electric caliper brake according to one embodiment of the present invention is formed such that the spindle member 152 includes a first screw thread portion 152a and a second screw thread portion 152b.

Here, the first screw thread portion 152a is formed to have a pitch corresponding to a screw thread formed on the nut member 154 and has a length L1.

Here, the first screw thread portion 152a is disposed at a side of front end portion of the spindle member 152 and may transmit rotational power received from the actuator 160 to the piston 140 such that the piston 140 presses the pair of pad plates 111 and 112 or releases the pressure in a case in which the nut member 154 moves on the first screw thread portion 152a.

Meanwhile, the second screw thread portion 152b may be disposed to have the same axis as that of the first screw thread portion 152a and be formed to have a pitch which is different from that of the first screw thread portion 152a and have a length L2. Here, the pitch of the second screw thread portion 152b may be less or greater than that of the first screw thread portion 152a. As an example, the second screw thread portion 152b may have a pitch which is 0.8 to 1.2 times that of the first screw thread portion 152a. Here, the lengths and the pitches of the first screw thread portion 152a and the second screw thread portion 152b may be variously selected or changed according to a specification of a vehicle in which the electric caliper brake is installed.

Since the second screw thread portion 152b and the first screw thread portion 152a have different pitches as described above, a second frictional force between the screw thread of the nut member 154 and the second screw thread portion 152b may be greater than a first frictional force between the screw thread of the nut member 154 and the first screw thread portion 152a when the screw thread formed on the nut member 154 rotates about the second screw thread portion 152b, a frictional force may increase as a contact area between the nut member 154 and the second screw thread portion 152b increases while the nut member 154 rotates about the second screw thread portion 152b, and a controller (not shown) may control a current to control the actuator so as to stop rotation of the nut member when the frictional force reaches a predetermined frictional force.

Here, a height of a screw thread of the second screw thread portion 152b is the same as that of a screw thread of the first screw thread portion 152a, and the first screw thread portion 152a and the second screw thread portion 152b may be formed to be continuously connected.

According to one embodiment of the present invention, the spindle member 152 including the first screw thread portion 152a and the second screw thread portion 152b may be formed as a single member.

The length L1 of the first screw thread portion 152a may be greater than the length L2 of the second screw thread portion 152b, the power transmission module 150 may transmit power to operate the piston 140 when the nut member 154 rotates about the first screw thread portion 152a, a frictional force between the second screw thread portion 152b and the nut member 154 may increase when the nut member 154 rotates about the second screw thread portion 152b, a current supplied to the actuator may be controlled to stop rotation of the nut member 154 when the frictional force reaches a predetermined frictional force, and thus the second screw thread portion 152b may serve as a stopper for stopping rotation of the nut member 154.

Figure 5:
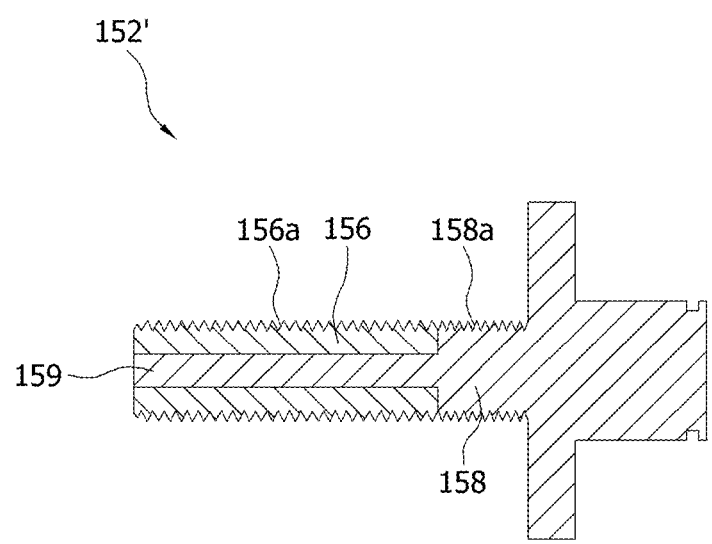
FIG. 5 is a cross-sectional view illustrating another embodiment of the spindle member of the power transmission module of FIG. 2.

FIG. 5 is a cross-sectional view illustrating another embodiment of the spindle member of the power transmission module of FIG. 2.

Referring to FIG. 5, a spindle member according to another embodiment of the present invention may be formed such that a spindle member 152' includes a first bolt member 156 and a second bolt member 158.

Here, the first bolt member 156 may be formed as a hollow rod member in which a first screw thread portion 156a is formed on an outer circumferential surface thereof.

In addition, the second bolt member 158 may include a central axis 159, which is coupled to a hollow portion of the first bolt member 156 at one side thereof, and a second screw thread portion 158a continuously disposed to be adjacent to the first screw thread portion 156a.

Since the central axis 159 of the second bolt member 158 is insertion-coupled to the hollow portion of the first bolt member 156, the first bolt member 156 may be coupled to the second bolt member 158, and accordingly, the first bolt member 156 and the second bolt member 158 may be formed as the single spindle member 152'. Since an operation of the spindle member 152' is the same as that of the previous embodiment in a state in which the first bolt member 156 and the second bolt member 158 are coupled, the operation thereof will not be described.

In the electric caliper brake according to one embodiment of the present invention, since the screw thread portion having the pitch different from that of the nut member is formed in the spindle member to measure a magnitude of a frictional force applied to the nut member and control an operation of the actuator, a stopper may not be installed in the cylinder in addition to the spindle member, rotation is stopped due to the frictional force between the screw thread portion of the spindle member and the nut member, and thus vibration and friction noise can be reduced. In addition, a processing cost for forming the separate stopper in the cylinder in the electric caliper brake according to one embodiment of the present invention can be reduced.

As described above, in an electric caliper brake according to one embodiment of the present invention, since a spindle member includes a first screw thread portion corresponding to a screw thread formed on a nut member and a second screw thread portion having the same axis as that of the first screw thread portion and a pitch different from that of the first screw thread portion, when the nut member comes into contact with the second screw thread portion and rotates, rotation of the nut member stops due to an increase in a frictional force between the nut member and the second screw thread portion, and thus there is an effect in which vibration and friction noise and a processing cost decrease.

As described above, although the present invention has been shown and described with respect to a few specific embodiments and drawings, the present invention is not limited thereto and may be variously modified and changed by those skilled in the art in the technical concept of the present invention, the scope defined in the claims, and their equivalents.

What is claimed is:

1. An electric caliper brake including a carrier in which a pair of pad plates are installed to be movable forward and backward and a caliper housing in which a cylinder having a piston installed to be movable forward to and backward from the carrier due to a hydraulic pressure is provided, the electric caliper brake comprising a power transmission module, which includes a spindle member installed to pass through a rear portion of the cylinder and configured to receive rotational power from an actuator to rotate, and a nut member screw-coupled to the spindle member, disposed in the piston, and configured to move forward or backward according to rotation of the spindle member to operate the piston, wherein the spindle member includes a first screw thread portion corresponding to a screw thread formed on the nut member and a second screw thread portion, which is disposed to have the same axis as that of the first screw thread portion and has a pitch which is different from that of the first screw thread portion, and when the nut member rotates about the second screw thread portion, a frictional force between the screw thread of the nut member and the second screw thread increases, and wherein the electric caliper brake further comprises a controller configured to control a current supplied to the actuator to stop rotation of the spindle member when the frictional force between the screw thread of the nut member and the second screw thread increases to have a predetermined frictional force.

2. The electric caliper brake of claim 1, wherein the first screw thread portion is disposed at a side of an end portion of the spindle member to be closer to the carrier than the second screw thread portion.

3. The electric caliper brake of claim 1, wherein the pitch of the second screw thread portion is 0.8 to 1.8 (excepting 1) times that of the first screw thread portion.

4. The electric caliper brake of claim 1, wherein the spindle member includes:

a first bolt member formed in a hollow form and including the first screw thread portion; and a second bolt member in which a central shaft coupled to a hollow portion of the first bolt member is formed to protrude and which includes the second screw thread portion disposed adjacent to the first screw thread portion.

\* \* \* \* \*